United States Patent [19]

Suzuki et al.

[11] Patent Number: 5,770,905
[45] Date of Patent: Jun. 23, 1998

[54] CLAW POLE TYPE SYNCHRONOUS MOTOR

[75] Inventors: Yuzuru Suzuki; Sakae Fujitani; Takashi Ishii, all of Asaba-cho, Japan

[73] Assignee: Minebea Co., Ltd., Nagano-ken, Japan

[21] Appl. No.: 814,252

[22] Filed: Mar. 11, 1997

[30] Foreign Application Priority Data

Apr. 19, 1996 [JP] Japan .................................. 8-120862

[51] Int. Cl.$^6$ ................................................. H02K 21/14
[52] U.S. Cl. .......................... 310/85; 310/257; 310/49 R; 310/89
[58] Field of Search .......................... 310/85, 257, 49 A, 310/49 R, 89

[56] References Cited

U.S. PATENT DOCUMENTS

| 4,045,697 | 8/1977 | Folik | 310/89 |
|---|---|---|---|
| 4,438,361 | 3/1984 | Manson | 310/90 |
| 4,695,419 | 9/1987 | Inariba | 264/259 |
| 4,985,669 | 1/1991 | Smith | 310/49 R |
| 5,004,941 | 4/1991 | Ohzehki | 310/49 R |
| 5,126,605 | 6/1992 | Palmero | 310/36 |
| 5,148,895 | 9/1992 | Kakizaki | 310/89 |
| 5,410,201 | 4/1995 | Tanaka | 310/68 B |
| 5,548,885 | 8/1996 | Yamada | 310/49 R |

FOREIGN PATENT DOCUMENTS 0 685 843 A1  12/1995  European Pat. Off. ........ G11B 19/20

OTHER PUBLICATIONS

Patent Abstracts of Japan, vol. 018, No. 073 (E–1503), 7 Feb. 1994 and JP 05–284710 A (Mitsubishi Electric Corp.), 29 Oct. 1993—Abstract Only.

T. Kenjo; "Stepping Motors and Their Microprocessor Controls"; 1984; pp. 40–45; Oxford Science Publications; Monographs in Electrical and Electronic Engineering 16.

*Primary Examiner*—Steven L. Stephan
*Assistant Examiner*—B. Mullins
*Attorney, Agent, or Firm*—Frishauf, Holtz, Goodman, Langer & Chick

[57] ABSTRACT

A shield plate for preventing the leakage of a magnetic flux and for reducing acoustic/electromagnetic noise leaking out from the interior of the motor is arranged so as to cover the corresponding end surface of an armature. The inner diameter of the shield plate is made smaller than the outer diameter of a rotor in order to prevent the rotor from being detached from a stator assembly.

8 Claims, 3 Drawing Sheets

CLAW POLE TYPE SYNCHRONOUS MOTOR

BACKGROUND OF THE INVENTION

1. Field of the Invention

The present invention relates to a claw pole type synchronous motor used as a spindle motor of a memory device such as an FDD (floppy disk drive) or an HDD (hard disc drive) or a CD-ROM.

2. Description of the Related Art

The spindle motor of a memory device such as an FDD, an HDD or a CD-ROM is required to have high operating efficiencies such as a high rotational accuracy, very small magnetic leakage and low acoustic/electromagnetic noise. Conventionally, therefore, a three-phase brushless DC motor which has high operating efficiencies has been used. Since, however, it has been strongly demanded recently that the manufacturing cost of memory devices should be reduced, an expensive three-phase brushless motor has not come to meet this demand.

In order to fulfill the requirements of high operating efficiencies and low cost, it is considered to use a claw pole type synchronous motor which can be manufactured at a low cost as the spindle motor. However, since the exciting coil of the motor is a solenoid coil, there occurs leakage of a large alternating magnetic flux which reverses its direction along the axis of rotation at each excitation time. The alternating magnetic flux intersects the reading/writing head of the memory device, resulting in the head having a degraded output characteristic (S/N). This makes it impossible to use the conventional synchronous motor.

SUMMARY OF THE INVENTION

The object of the present invention is to provide an inexpensive claw pole type synchronous motor which can be used as the spindle motor of a memory device.

In order to achieve the object, a claw pole type synchronous motor according to the present invention includes an armature, a rotor having a rotating axis and a shield plate, (I) the armature having two stator assemblies superposed in a direction of the rotating axis and each of the stator assemblies comprising:
  (A) stator yokes made of soft steel material and each provided with
    (a) a circular doughnut shaped base having an inner peripheral edge, an outer peripheral edge and an axis,
    (b) pole teeth bent at the inner peripheral edge so as to extend in a direction of the axis,
    (c) an outer wall bent at the outer peripheral edge so as to extend in the direction of the axis, and
    (d) an annular armature coil receiving portion defined by the base and the pole teeth; and
  (B) an armature coil formed by winding insulated wires and mounted in the armature coil receiving portion,
(II) the rotor having an outer diameter, facing the pole teeth with a small gap provided between the rotor and the pole teeth and comprising:
  (C) the stator assemblies provided with a flange and a bearing provided on said flange, and
  (D) a field magnet of a permanent magnet type having an end face corresponding to the rotor inserting side face of said armature, and
(III) the shield plate having an inner diameter smaller than the outer diameter of the rotor and fixed to the rotor inserting side face of the armature in such a manner that the shield plate covers the rotor inserting side face of the armature and the end face of the field magnet, for preventing magnetic leakage, reducing acoustic/electromagnetic noise leaking from the interior of the motor and for preventing the rotor from being detached from the stator assemblies.

Moreover, according to the present invention, that part of the shield plate which corresponds to the field magnet of the rotor can be provided with a plurality of dowels which project toward the field magnet and which are used for preventing attraction to the field magnet.

The claw pole type synchronous motor of the present invention can be manufactured at a low cost. Also by providing the motor with the shield plate, the leakage of a magnetic flux, acoustic/electromagnetic noise and/or the like to the outside of the motor is considerably reduced, and the rotor is prevented from being detached from the stator assembly. Further, the dowels are formed on the shield plate so that the shield plate does not contact the field magnet when the shield plate is attached to the armature. That is, dowels prevent the shield plate from being attracted to the field magnet even if the rotor oscillates in axial directions. Thus, the rotor smoothly rotates without being attracted to the shield plate.

DETAILED DESCRIPTION OF THE PREFERRED EMBODIMENT

An embodiment of the present invention will now be described with reference to the drawings.

Figure 1:
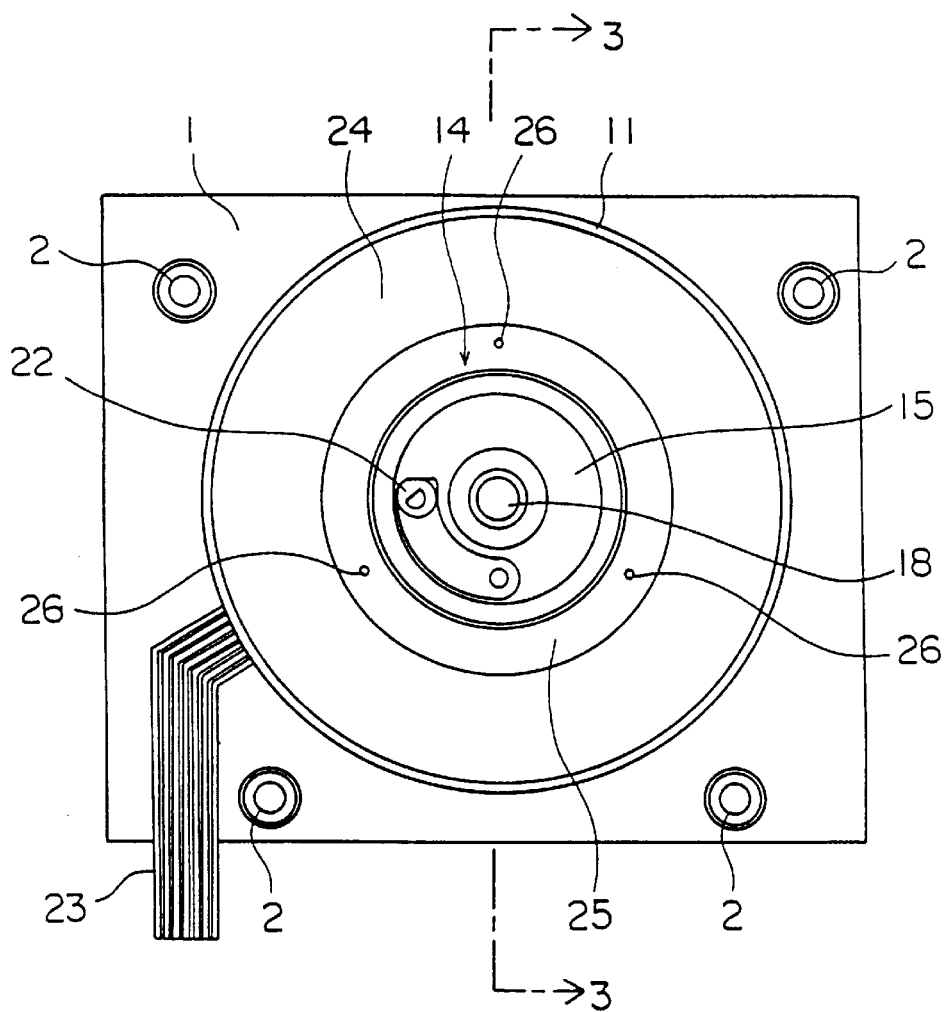
FIG. 1 is a plan view of an FDD spindle motor according to an embodiment of the present invention.
Figure 2:
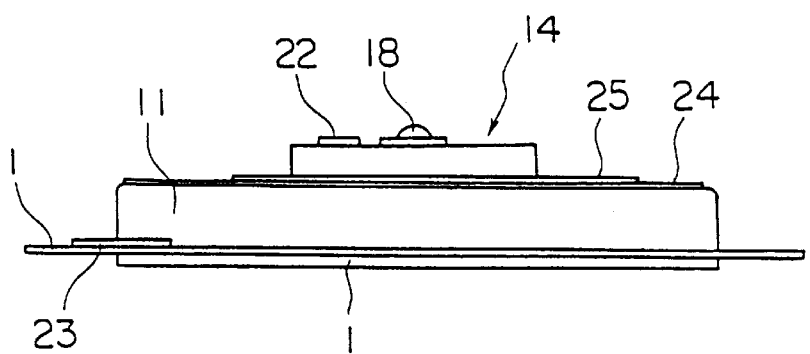
FIG. 2 is a lateral side view of FIG. 1.
Figures 3, 4:
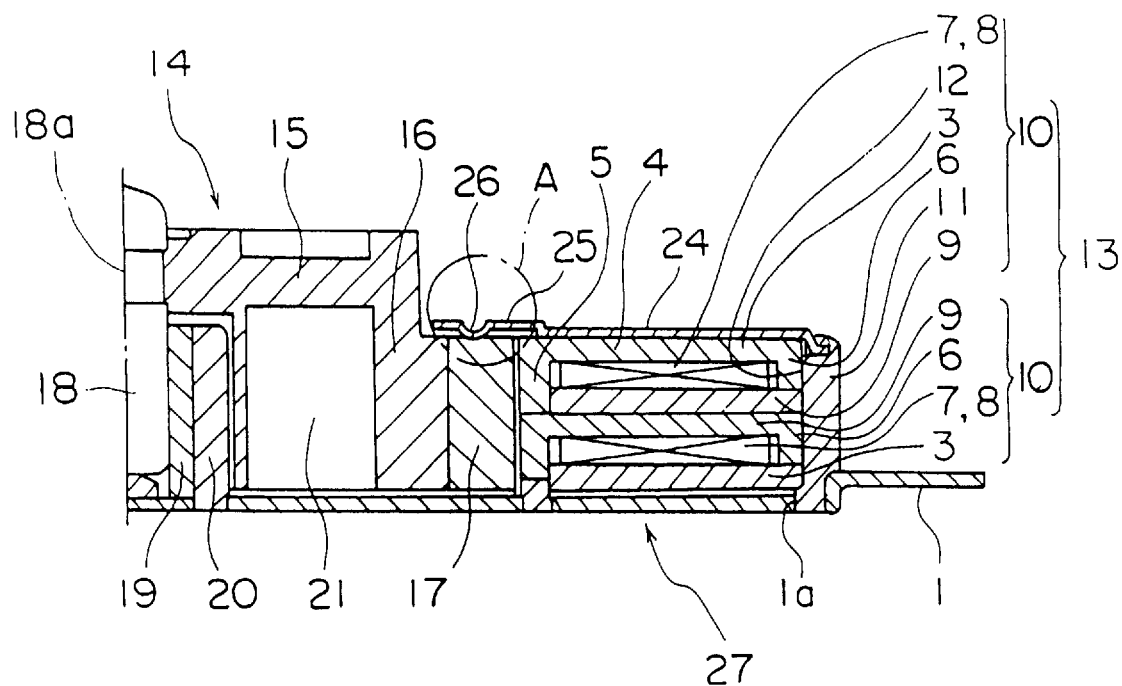
FIG. 3 is a sectional view taken along line 3—3 in FIG. 1.
FIG. 4 is a detailed enlarged cross-sectional view of a dowel shown in a circle A in FIG. 3.

As shown in FIGS. 1 to 3, a claw pole type synchronous motor of the present embodiment has a plate-like flange 1 in which a recess 1a is formed into the shape of a shallow dish. Attachment holes 2 are formed in four corners of the flange 1 in order to attach the flange 1 to a desired attached portion of a mount (not shown) by means of screws (not shown). A stator yoke 3 comprises a circular doughnut shaped base 4, high trapezoidal pole teeth 5 extending axially of the base 4 from the circular inner peripheral edge of the base 4 and an outer wall 6 extending radially of the base 4 from the outer peripheral edge of the base 4. The stator yoke 3 is made from a soft steel plate by punching out at the same time (a) first portions having the shape and size of the corresponding pole teeth 5 and extending radially inward from a circular line, which will form the inner peripheral edge of the base 4, and (b) a second portion having the width of the outer wall 5 and extending radially outward from another circular line which will form the outer peripheral edge of the base 4, and finally by bending the first and second portions at substantially right angles in the same direction so as to form the pole teeth 5 and the outer wall 6.

The base 4, the pole teeth 5 and the cylindrical outer wall 6 form an annular recessed ring-shaped armature coil receiving portion 7 having two ends, one end being closed by the base 4 and the other end being opened. An armature coil 8 is formed by winding an insulated wire such as a polyurethane copper wire or the like. The armature coil 8 is inserted in the armature coil receiving portion 7 from its other end (that is, the opposite side to the flange 1). After the armature coil 8 has been inserted, a stator yoke 9, which is identical with the above-described stator yoke except that it does not have the cylindrical outer wall 6, is fitted to the aforementioned other end of the armature coil receiving portion 7, thus forming a stator assembly 10.

A ring-shaped armature holding member 11 has one end (the lower end in FIG. 3) fixed to the outer periphery of the recess 1a of the flange 1. Two stator assemblies 10 are sequentially inserted from the opposite side to the flange 1 in an armature mounting hole 12 defined by the inner circumferential surface of the armature holding member 11, with the outer circumferential surfaces of the outer wall portions 6 of the stator assemblies 10 being in contact with the inner circumferential surface of the armature holding member 11. The two stator assemblies 10 thus incorporated comprise an armature 13. The two stator assemblies 10, a bearing 19 (described later) and the flange 1 may be insert-molded with the armature holding member 11. Here, the stator assemblies 10, the bearing 19 and the flange 1 comprise the stator 27.

A rotor 14 has a disk portion 15, a cylindrical skirt portion 16 integrally formed with the outer periphery of the disk portion 15, a cylindrical field magnet 17 of a permanent magnet type fixed to the outer circumferential surface of the skirt portion 16 and which has a plurality of magnetic poles, and a main shaft 18 having one end (the upper end in FIG. 3) fixed to the center of the disk portion 15 and having a rotating axis 18a which is also the rotating axis of the rotor 14. By rotatably inserting the main shaft 18 into a supporting shaft 20 whose one end (the lower end in FIG. 3) is fixed via the bearing 19 to the flange 1, the rotor 14 is set coaxially with the armature 13 in a recessed columnar rotor receiving portion 21 defined by the inner circumferential surface of the armature.13. The diameter of the outer circumferential surface of the rotor 14, in other words, the diameter of the outer circumferential surface of the field magnet 17 is made slightly smaller than the diameter of the inner circumferential surface of the armature 13. In other words, the field magnet 17 is mounted in the recessed columnar rotor receiving portion 21 which is defined by the pole teeth 5 of the armature 13, so that the field magnet 17 faces the pole teeth 5 with a predetermined small gap provided between the field magnet 17 and the pole teeth 5.

As shown in FIGS. 1 and 2, an outer peripheral portion of the free surface (the upper surface in FIGS. 1 and 2) of the disk portion 15 is provided with a drive pin 22 for transmitting rotation of the motor to the corresponding floppy disk. As shown in FIG. 1, leading-out lines 23 are drawn out from the armature coil 8.

As shown in FIG. 3, that end face of the armature 13 which is opposite to the flange 1 is covered with a circular doughnut shaped shield plate 24 which is made of ferromagnetic material. The outer diameter of the shield plate 24 has such a value as to allow the outer periphery of the shield plate 24 to be fixed by caulking or the like to the corresponding portion of the armature holding member 11. Moreover, the inner diameter of the shield plate 24 is smaller than the outer diameter of the field magnet 17. By covering part or the whole of the armature 13 and the field magnet 17 with the shield plate 24, the magnetic flux leaking from the armature 13 and the field magnet 17 to the outside of the motor are reduced considerably.

As shown in FIG. 2, the shield plate 24 covers that end of the armature 13 which is opposite to the flange 1. The outer periphery of the shield plate 24 is fixed by caulking or the like to the corresponding end (the upper end in FIG. 3) of the armature holding member 11. An inner peripheral part of the shield plate 24 has a circular doughnut shaped portion 25 (hereinafter referred to as "the field magnet corresponding portion") which corresponds to the field magnet 17. The field magnet corresponding portion 25 is formed so that it is spaced by a predetermined interval K (for example, 0.5 mm) from that end face of the field magnet 17 which corresponds to the field magnet corresponding portion 25.

A plurality of dowels 26 having a hemispherical shape or another smooth shape and projecting toward the field magnet 17 from that surface of the field magnet corresponding portion 25, which faces the field magnet 17, are arranged so as to be spaced in a circumferential direction of the field magnet 17. In the case of FIG. 1, three dowels are arranged at equal intervals in the circumferential direction. The number of the dowels may be four to ten, instead. The height or radius L of each dowel 26 is, for example, 0.2 mm smaller than the interval K between the field magnet corresponding portion 25 and the field magnet 17 in order to normally prevent the dowels 26 from colliding and interfering with the field magnet 17 during the rotation of the rotor 14. Even if the dowels 26 happen to contact the filed magnet 17, the whole portion of the field magnet corresponding portion 25 does not contact the field magnet 17 because of the presence of the dowels 26. Thus, the shield plate 24 does not contact the field magnet 17 except for the dowels 26.

Figure 5:
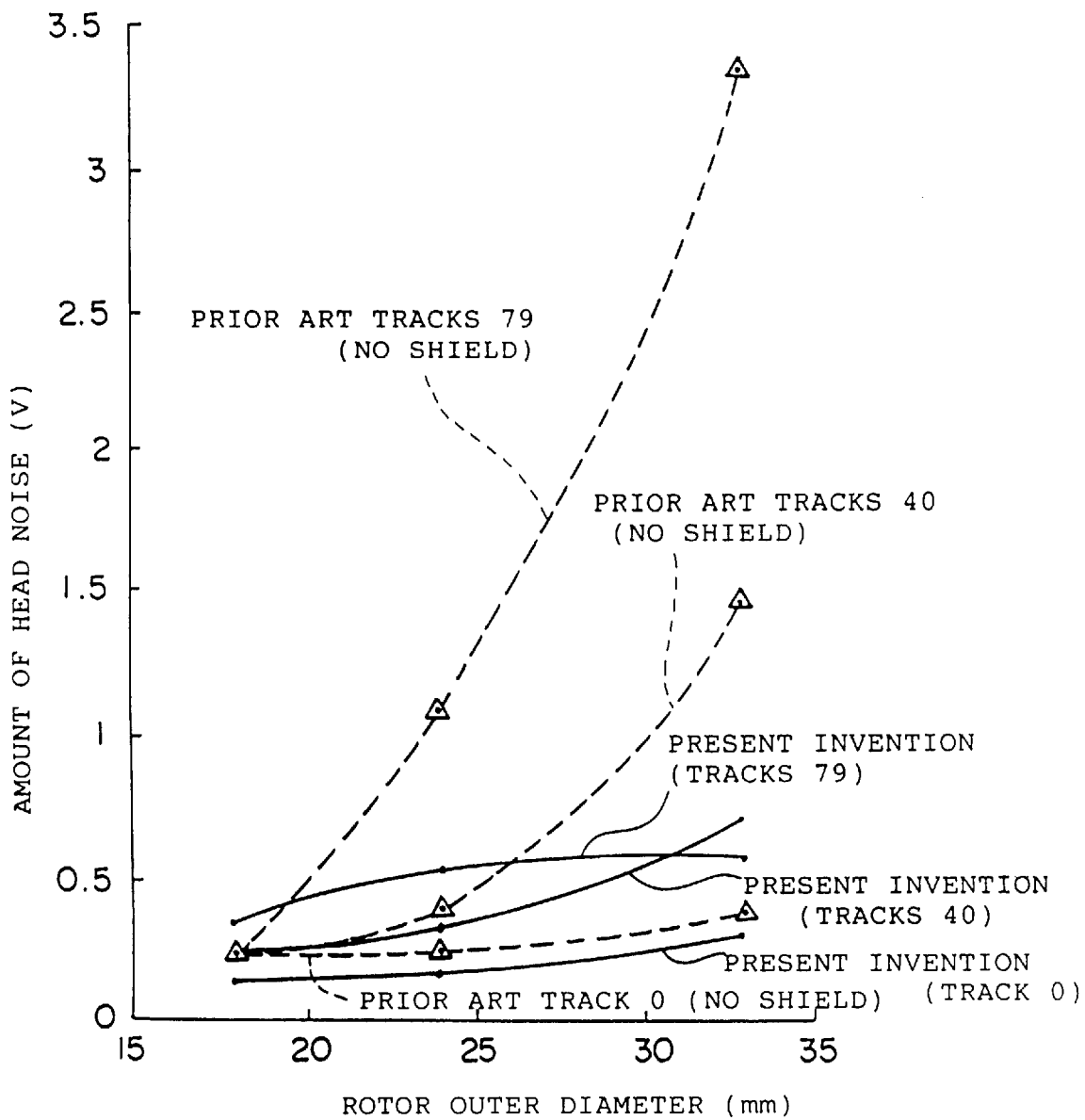
FIG. 5 is a characteristic diagram showing the relationship between the head noise and the rotor diameters of the present invention and the prior art.

FIG. 5 is a characteristic diagram showing the relationship between the rotor diameters of the present invention and the prior art and the head noise which is defined as acoustic/electromagnetic noise leaking from the interior of the motor to the outside thereof. As can be understood from this diagram, the rotor of the claw pole type synchronous motor according to the present invention provides a considerably reduced head noise (V) as compared with the claw pole type synchronous motor of the prior art in any one of the cases of 0, 40 and 75 tracks when the rotor diameters of the motors are 18 mm or greater. Because the head noise is reduced, the claw pole type synchronous motor of the present invention can be used as a spindle for use in a magnetic memory device such as an FDD or an HDD.

The head noise problem will be described in more detail. When the claw pole type synchronous motor of the present invention is used as the spindle motor of the above-mentioned memory device, the motors each having a rotor with a diameter of 25 mm are employed in the most cases. However, in the claw pole type synchronous motor of the prior art which has no shield plate, the amount of head noise which indicates the level of the magnetic flux leaking to the outside of the motor exceeds the limit value allowed to the memory device on which the motor is mounted. When the outer diameter of the rotor is 25 mm, the limit value is 0.6 V in any one of the cases of 0 track, 40 tracks and 79 tracks. In the prior art, however, the amount of head noise is 0.25 V, 0.4 V and 1.3 V respectively in the cases of the tracks corresponding to those described above, as shown in FIG. 5. In the case of the tracks 79, the head noise exceeds the limit value of 0.6 V. Thus, the prior art the claw pole type synchronous motor cannot be used as the spindle motor of the memory device.

In contrast, according to the above-described embodiment of the present invention, the amount of head noise is 0.19 V, 0.36 V and 0.55 V in the cases of 0 track, 40 tracks and 79 tracks, respectively, and thus the amount of head noise does not exceed the limit value in any case. Hence, the claw pole type synchronous motor of the present invention can be used as the spindle motor of the memory device. It is clear that an advantage can be attained even if the shield plate 24 is arranged only at the portion corresponding to the head, and this structure is also included in the present invention.

The claw pole type synchronous motor of the present invention has an advantage in that it is simple in structure and accordingly can by provided at low cost as the spindle motor of a memory device in accordance with the demand of the market. By arranging the shield plate for covering the armature and the field magnet at that end surface of the motor which is fixed to an apparatus, the magnetic flux leaking from the armature and the field magnet is reduced, and the acoustic noise coming out of the interior of the motor is also lowered, making the motor advantageously suitable as the spindle motor of the memory device. Further, by making the inner diameter of the shield plate smaller than the outer diameter of the rotor, the advantage of the prevention of the detachment of the rotor from the stator assembly is attained. Moreover, by providing projecting dowels on that part of the shield plate which faces the field magnet, the adherence of the shield plate to the field magnet is prevented so that the rotation of the rotor is not adversely affected.

What is claimed is:

1. A claw pole type synchronous motor including a plate-like flange, an armature, and a rotor mounted on said flange coaxially with said armature, wherein:
   (I) said armature has two stator assemblies superposed in a direction of a rotating axis of said rotor, each of said stator assemblies comprising:
      (A) stator yokes made of soft steel material, each of said stator yokes including:
         (i) a circular doughnut shaped base having an inner peripheral edge, an outer peripheral edge, an axis, and a shield plate made of a ferromagnetic material for preventing magnetic leakage and reducing acoustic/electromagnetic noise from said motor,
         (ii) pole teeth bent at said inner peripheral edge so as to extend in a direction of said axis of said base,
         (iii) an outer wall bent at said outer peripheral edge so as to extend in said direction of said axis of said base, and
         (iv) an annular armature coil receiving portion defined by said base and said pole teeth; and
      (B) an armature coil formed by wound insulated wires and mounted in said armature coil receiving portion;
   (II) said rotor has an outer diameter such that said rotor faces said pole teeth of said stator yokes of said two stator assemblies with a small gap provided between said rotor and said pole teeth, one of said two stator assemblies being mounted on said plate-like flange, and said rotor including a field magnet of a permanent magnet type having an end face at an opposite side of said field magnet to said flange;
   (III) said shield plate has a central hole with an edge defining an inner diameter smaller than said outer diameter of said rotor so that the rotor is prevented from being detached from said two stator assemblies, said shield plate being fixed to said armature such that said shield plate covers said armature and said end face of said field magnet with a space provided between said shield plate and said end face of said of said field magnet; and
   IV) a contact prevention member is provided for preventing said shield plate from contacting said field magnet, said contact prevention member being formed on said shield plate so as to face said end face of said field magnet with a gap therebetween in a normal state of operation of said motor.

2. The motor according to claim 1, wherein said shield plate includes a portion facing said end face of said field magnet, and said contact prevention member comprises at least one dowel formed on said portion of said shield plate so as to extend toward said field magnet by such an amount that said shield plate is prevented from contacting said field magnet.

3. The motor according to claim 1, wherein said at least one dowel comprises a plurality of dowels arranged circumferentially on said shield plate.

4. The motor according to claim 3, wherein said plurality of dowels comprises between two and ten dowels.

5. The motor according to claim 1, wherein said shield plate has a doughnut shape whose inner periphery is the edge defining the inner diameter of said shield plate.

6. The motor according to claim 5, wherein said shield plate includes a portion facing said end face of said field magnet, and said contact prevention member comprises at least one dowel formed on said portion of said shield plate so as to extend toward said field magnet by such an amount that said shield plate is prevented from contacting said field magnet.

7. The motor according to claim 6, wherein said at least one dowel comprises a plurality of dowels arranged circumferentially on said shield plate.

8. The motor according to claim 7, wherein said plurality of dowels comprises between two and ten dowels.

* * * * *